United States Patent [19]

Fagan

[11] Patent Number: 4,783,354

[45] Date of Patent: Nov. 8, 1988

[54] ADHERABLE, YET REMOVABLE SHEET MATERIAL

[75] Inventor: Joseph P. Fagan, Holmdel, N.J.

[73] Assignee: Coated Sales, Inc., Laurence Harbor, N.J.

[21] Appl. No.: 941,398

[22] Filed: Dec. 15, 1986

[51] Int. Cl.$^4$ .................. A61F 13/02; C09U 7/02; C09J 7/02

[52] U.S. Cl. ..................... 428/40; 428/355; 428/914; 428/343; 427/152

[58] Field of Search ............... 428/40, 355, 914, 343; 427/152

[56] References Cited

U.S. PATENT DOCUMENTS

| | | |
|---|---|---|
| 2,142,039 | 12/1938 | Abrams et al. |
| 3,275,469 | 4/1961 | Streit . |
| 3,922,464 | 11/1975 | Silver et al. ................ 428/355 |
| 4,151,319 | 4/1979 | Sackoff et al. . |
| 4,339,485 | 7/1982 | Shibano et al. ................ 428/40 |
| 4,355,074 | 10/1982 | Stemmler et al. . |
| 4,440,830 | 4/1984 | Wempe ................ 428/352 |
| 4,471,082 | 9/1984 | Kwok et al. ................ 524/46 |
| 4,548,845 | 10/1985 | Parsons et al. ................ 428/40 |

FOREIGN PATENT DOCUMENTS

1333710  10/1973  United Kingdom .

Primary Examiner—John E. Kittle
Assistant Examiner—Patrick J. Ryan
Attorney, Agent, or Firm—Kenyon & Kenyon

[57] ABSTRACT

A sheet material which can be firmly adhered to a surface, and yet readily removed therefrom, without the necessity of pre-wetting and without damaging the surface is prepared by coating one side of a base sheet with an adhesive composition containing a tacky, pressure sensitive adhesive, a wax, water, and an emulsifier. The adherable, yet removable nature of the sheet material does not degrade, but instead is maintained, over time. The sheet material is suitable for use as wallpaper, shelving paper, posters, note pads, labels, and the like.

15 Claims, No Drawings

ADHERABLE, YET REMOVABLE SHEET MATERIAL

FIELD OF INVENTION

This invention pertains to adherable, yet removable sheet materials suitable for use as wallpaper, shelving paper, posters, note pads, labels, and the like, which maintain their adherable, yet removable nature over extended periods of time.

BACKGROUND

Adhesive sheet materials such as wallpaper, shelving paper, posters, note pads, labels, and the like, which are to be applied to a variety of surfaces for decorative, or protective purposes, have traditionally been prepared by coating a base sheet with a water-activated or water-based adhesive, e.g., wallpaper paste.

Sheet materials prepared with such adhesives suffer from a variety of defects which render them particularly unsuited for use by homeowners or other "do-it-yourselfers". In the first place, such sheet materials are generally very messy and time consuming to apply. The homeowner is either required to prepare a messy, wet paste which is brushed onto the sheet material, or wet out large sheets coated with a water-activated adhesive, which are cumbersome and difficult to handle.

It is also difficult, if not practically impossible to remove such sheet materials from the adhered-to surface after the adhesive has dried, in order to redecorate or return the surface to its original condition. It is usually necessary to thoroughly wet the sheeting and then scrape it from the surface.

More recently, adhesive sheet materials have been prepared by coating a base sheet with a pressure sensitive adhesive. As known in the art, the term "pressure sensitive" is used to describe those synthetic and natural resins having a viscoelastic property termed "tack". Generally, pressure sensitive adhesives need not undergo a phase change in order to bond materials together. See, F. Keimel, *Adhesives*, vol. 22 *Encyclopedia of Chemical Technology* 3rd ed. (Kirk-Othmer 1983) p. 490, incorporated by reference herein.

The use of pressure sensitive adhesives is desirable because there is no need for the homeowner to apply a water-based adhesive or wet a previously applied water-activated adhesive. However, prior proposals for providing a sheet material which is coated with a pressure sensitive adhesive have the following disadvantages, among others. It is often difficult to position or reposition these adhesive-coated sheet materials during application to avoid the occurrence of bubbles or wrinkles, and to properly match any designs or patterns.

Moreover, it is difficult to remove the adhesive-coated sheet material from the surface after it has been in place for a period of time without leaving an adhesive residue on the surface, or otherwise damaging or marring the surface. Thus, such sheet materials are unsuited for use by renters or other consumers who are required to return the wall or other surface to its original coddition. Additionally, because such sheet materials are difficult to remove, homeowners have limited freedom to redecorate their surroundings.

Attempts to produce a firmly adhesive sheet material which can be easily positioned or repositioned during the application period, by using pressure sensitive adhesives, have so far failed to provide a commercially viable sheet material which does not require wetting during application and maintains its adherable, yet readily removable and repositionable nature with respect to a wide variety of surfaces over an extended period of time.

SUMMARY AND OBJECTS OF THE INVENTION

Accordingly, it is an object of the invention to provide a sheet material which adheres firmly to a wide variety of surfaces without wetting, and which can be readily removed therefrom or repositioned without damaging the surface, and a method for making the same.

Another object of the invention is to provide a sheet material which maintains its adherable, yet removable nature over an extended period of time, and a method for making the same.

Another object is to provide firmly adherable, yet removable and repositionable wallpaper, shelving paper, labels, note pads, posters, and the like. These and other subsidiary objects which will appear to one of ordinary skill in the art are achieved by the invention.

The present invention provides a modified pressure sensitive adhesive for an adherable, yet removable sheet material, which comprises a mixture of a wax-in-water emulsion and an aqueous emulsion of a pressure sensitive adhesive, wherein the wax and pressure sensitive adhesive are used in relative amounts effective to maintain the adherable, yet removable nature of the sheet material over an extended period of time, and wherein the wax-in-water emulsion comprises wax, water, and an emulsifier.

The weight ratio of pressure sensitive adhesive to wax preferably ranges from about 10:1 to about 30:1, more preferably ranges from 10:1 to about 20:1, and most preferably is about 15:1. The wax emulsion preferably comprises about 82% water, 17% wax, and 1% emulsifier by weight. The pressure sensitive adhesive preferably comprises an intrinsically tacky polymer, which is preferably an acrylic polymer having a glass transition temperature of below about 0° C. The aqueous emulsion of the pressure sensitive adhesive preferably comprises water and pressure sensitive adhesive in a weight ratio of about 1:1.

The modified pressure sensitive adhesive may also comprise optional ingredients such as a defoamer or viscosity modifier. A particularly suitable modified adhesive comprises from about 35 to about 45% pressure sensitive adhesive, from about 1.5 to about 3.5% wax, from about 0.1 to about 0.2% emulsifier, from about 0.1 to about 2% ammonia, from about 0.7 to about 3% thickener, about 3% defoamer by weight, and water, wherein the solids content of the modified adhesive ranges from about 35 to about 50% by weight.

The invention also provides an adherable, yet removable sheet material prepared from the modified adhesive of the invention, which comprises a base sheet coated on its inner surface with the modified adhesive, wherein the modified adhesive coating has been sufficiently heated (dried and/or cured) to render it tacky and adherably viscous. The sheet material preferably further comprises a release sheet, laminated on its inner surface to the adhesive coated surface of the base sheet.

The invention also provides a method for preparing an adherable, yet removable sheet material which comprises the steps of coating the inner surface of a base sheet with the modified adhesive of the invention, and sufficiently heating the modified adhesive coating to render it tacky and adherably viscous. The method preferably further comprises the step of laminating the release surface of a release sheet to the adhesive-coated surface of the base sheet.

The invention also provides an alternative, and more preferable method for preparing an adherable, yet removable sheet material, which comprises the steps of coating the modified adhesive of the invention onto the release surface of a release sheet, heating the modified adhesive coating sufficiently to render it tacky and adherably viscous, and laminating the inner surface of a base sheet to the adhesive-coated surface of the release sheet.

DETAILED DESCRIPTION OF THE INVENTION

While the invention is susceptible to various modifications and alternative forms, the preferred embodiments are described in detail herein.

The present invention provides a sheet material suitable for use as wallpaper, shelving paper, and the like which adheres firmly to a surface, such as as a wall or shelf, and yet can be readily removed therefrom or repositioned without marring or damaging the surface, i.e. the sheet material can be removed without leaving an adhesive residue or altering the adhered-to surface in any significant respect. Additionally, the adherable, yet releasable and removable nature of the sheet material is maintained over time.

This is achieved by applying a specifically formulated modified pressure sensitive adhesive to the inner surface of a base sheet, by either a direct or indirect coating process as described hereinafter. The modified pressure sensitive adhesive should be sufficiently viscous so that it maintains a constant thickness without agglomerating or leaving uncoated areas when applied to the base sheet, using the particular coating process selected. The modified adhesive coating is then sufficiently heated to dry and/or cure the adhesive, thereby providing a tacky coating which is adherably viscous, i.e. which does not ooze or flow when adhered to the selected surface.

The modified pressure sensitive adhesive includes wax relative amounts effective to maintain the adherable, yet removable nature of the sheet material over an extended period of Although the particular amounts used will depend on the release characteristics of the wax and the strength of the adhesive, the weight ratio of pressure sensitive adhesive to wax preferably ranges from about 10:1 to about 30:1, more preferably ranges from about 10:1 to about 20:1, and is most preferably about 15:1.

As described below, the modified adhesive may also include optional ingredients such as a defoamer, or viscosity modifier (either a diluent, such as ammonia, or a thickener).

The pressure sensitive adhesive may be selected from a broad range of materials well known in the art, or mixtures thereof. Such materials conventionally comprise a natural or synthetic polymer or resin which is intrinsically tacky, or has intermixed therewith a resin imparting tackiness.

Intrinsically tacky polymers include acrylic ester polymers and copolymers thereof, polyvinyl ethers, polyurethanes, polyvinylidene chloride, natural and synthetic rubber, polyisobutylene, polybutadiene, polystyrene, and mixtures thereof.

Tackifying resins include hydrocarbon resins, terpene resins, resin derivatives, such as hydrogenated resins and esters, and liquid mixtures of polymeric styrene and homologues.

The pressure sensitive adhesive preferably comprises an intrinsically tacky polymer, which is most preferably an acrylic polymer (or copolymer). To a certain extent, the glass transition temperature ("$T_g$") of an acrylic polymer is an indication of its surface tack. If an acrylic polymer is utilized in the present invention, it preferably has a $T_g$ which is lower than about 0° C., and which more preferably lies in the range of about $-40°$ C. to about $-60°$ C.

The actual tackiness required of the pressure sensitive material will depend on a variety of factors, such as the nature of the surface to which the sheet material is adhered, the weight of the base sheet utilized, and the release characteristics of the particular wax which is combined with the pressure sensitive adhesive. In general, however, the pressure sensitive adhesive must impart sufficient tack to the modified adhesive coating composition so that the adhesive-coated sheeted material adheres firmly to the selected surface over an extended period of time.

The pressure sensitive adhesive is preferably used in the form of an aqueous emulsion or latex, which is most preferably an acrylic latex comprising water and acrylic polymer in a weight ratio of about 1:1. However, the latex may also be utilized in solid form, a powdered solid form, or dissolved in solution.

Particularly suitable acrylic copolymer latices are "HYCAR® 2600x222" and "HYCAR® 26171" which are commercially available from B. F. Goodrich Company, Cleveland Ohio, and which contain about 50% water. HYCAR® 2600x222 has a $T_g$ of $-55°$ C., and a Brookfield viscosity of 110 cps, while HYCAR® 26171 has a $T_g$ of $-43°$, and a Brookfield viscosity of 125 cps. Another suitable acrylic latex is ROBOND® PS-61, which is available from Rohm and Haas, Philadelphia, Pa., and has a $T_g$ of about $-40°$ C.

Blends of suitable acrylic latices having different glass transition temperatures can also be utilized to adjust the tackiness imparted to the modified adhesive. In similar fashion, latices having different viscosities can be combined to adjust the coatability of the modified adhesive. The pressure sensitive adhesive preferably comprises a blend of HYCAR® 26000x222 and HYCAR® 26171; most preferably combined in a weight ratio of about 5:1.

The wax may be selected from a variety of natural or synthetic waxes, or mixtures thereof, which possess properties of good release with respect to the adhered-to substrate, and which possess some affinity for the pressure sensitive adhesive.

Additionally, the wax must possess certain other characteristics which make it suitable for use in the adherable sheet materials of the present invention. The wax should not substantially adversely affect the ability of the pressure sensitive adhesive to adhere firmly, but removably, to the surface to which it is applied, over extended periods of time.

Also, the wax must be capable of being uniformly dispersed in the pressure sensitive adhesive by conventional chemical and/or mechanical means, e.g. viscosity modification, or heating. Typically, for example, the wax is heated and formed into a wax-in-water emulsion.

Suitable naturally occurring waxes include mineral waxes such as paraffin (crystalline or amorphous), vegetable waxes, and animal waxes such as beeswax. Suitable synthetic waxes include fatty alcohols and acids, fatty acid esters, and glycerides. A particularly preferred wax is DR-220, a water emulsifiable, microcrystalline beeswax substitute having a melting point of 58°–62° C., an acid number of 20–24, an ester number of 60–68, and a saponification number of 80–92, which is commercially available from Dilco Waxes, Maspeth, N.Y.

It has been found advantageous to premix the wax with water and an emulsifier prior to incorporation into the modified pressure sensitive adhesive. The emulsifier preferably comprises a water soluble salt, and is most preferably hydrated sodium borate ("borax"). A particularly suited emulsifier is THREE ELEPHANT® borax, which has a water solubility of 4.78% by weight at 20° C., and which is available from Kerr-McGee Chemical Corporation, Okla.

As known to those skilled in the art, the relative amounts of water, wax, and emulsifier used will depend on the dispersability, i.e. the molecular weight and viscosity, of the particular wax selected. However, an emulsion comprising about 82% water, 17% wax, and 1% emulsifier by weight is generally preferred. Of course, any water added must be taken into account in computing the final solids content and viscosity of the resulting modified pressure sensitive adhesive.

When a water soluble salt emulsifier is utilized, the wax emulsion is preferably prepared by first heating the water and then dissolving the salt therein. Next, the wax is heated to a temperature, preferably at least 65° C., to facilitate melting. Then, the melted wax is slowly added to the salt solution, with mixing, until the dispersion cools to about 40° C. The wax and salt solution are mixed together vigorously and continuously, but at no time is a vortex produced.

The adhesive coating composition may also include a viscosity modifier selected from a wide variety of diluents or thickeners known to those skilled in the art. The viscosity modifier is chosen to impart sufficient viscosity to the modified adhesive so that the adhesive maintains a constant thickness without agglomerating or leaving uncoated areas when applied to the base or release sheet, using the particular coating process selected. Blends of suitable diluents and/or thickeners can also be used to adjust the viscosity of the modified adhesive.

Suitable diluents are water-soluble, and fugitive (low boiling point). A particularly suitable diluent is ammonia. Suitable thickeners include the ACRYSOL® ASE (alkali-soluble emulsions) thickeners marketed by Rohm and Haas Company, Philadelphia, Pa. These non-tacky thickeners also effect the rheology of the modified adhesive, thereby imparting "body", as well as modifying viscosity. A preferred thickener is "ASE-75" which imparts a light, creamy character, and which is an anionic emulsion containing 40% solids, and having a Brookfield viscosity of 20 cps.

Preferably, the modified pressure sensitive adhesive utilized in the present invention comprises from about 0.1 to about 2% by weight of ammonia, and from about 0.7 to about 3% by weight of a thickener. The ammonia and thickener are preferably diluted 50% by weight with water prior to incorporation in the modified pressure sensitive adhesive.

The defoamer may be selected from a wide variety of materials known to those skilled in the art. The defoamer prevents undesirable foaming of the modified adhesive and provides a continuous, bubble-free adhesive coating. A suitable defoamer is Bubble Breaker®748, commercially available from Witco, Houston, Tex. The modified pressure sensitive adhesive preferably comprises about 3% defoamer by weight.

The adhesive-coated sheet materials of the invention may be prepared with the modified adhesive described above by either a direct or indirect type coating process. Pursuant to the direct type process, the modified adhesive is directly coated onto the inner surface of a base sheet by one of the known coating techniques, including knife over roll, knife over blanket, engraved roll, reverse roll, rotogravure, printing, flexographic techniques, and the like.

The modified adhesive coating is then heated by conventional methods for pressure sensitive materials, e.g. by passing the coated sheet material through an oven at a temperature which is not damaging to the base sheet material. The coating must be sufficiently dried so that it is not flowable, but adherably viscous. At the same time, the coating should not be rendered bone-dry and non-tacky. If the pressure sensitive adhesive is a prepolymer, or in some other form requiring curing, e.g. the adhesive contains ethylenic unsaturation, sufficient heat must generally also be applied to thermoset the monomers or prepolymers into insoluble or infusible polymers.

The directly coated base sheet may then be married to the release surface of a "release sheet" as described hereinafter, to form a laminate of the release sheet, modified adhesive, and base sheet. The release sheet is removed or stripped off by the consumer prior to applying the adhesive-coated sheet material to the selected surface.

Pursuant to the indirect type of coating process, the adhesive coating is first coated onto the release surface of a release sheet by one of the known coating techniques; the adhesive is then sufficiently heated to provide a tacky, adherably viscon coating. The adhesive-coated surface of the release sheet is then married to the inner surface of the selected base sheet.

As known in the art, "release sheets" are typically used to protect the adhesive coating from contamination during subsequent processing, e.g. silk screen printing, and packaging. Release sheets, which are stripped off by the consumer prior to adhering the sheet material to the selected surface, are also applied to prevent the adhesive coating from sticking to the decorative front side of the sheet material, when the sheet material is rolled into reels for packaging or shipment.

Release sheets, and methods for their preparation are well known. Typically, the release sheet comprises a support sheet, such as Kraft paper, which is coated or impregnated on one surface (the "release surface") with a suitable release material, such as a silicone, which possesses properties of good release with respect to the pressure sensitive adhesive so that the release sheet can be readily removed at a later date by the consumer.

Due to the release characteristics of the adhesive sheet material prepared according to the invention, it can be stored in rolls without applying a release sheet over the adhesive coating. However, it is contemplated that a release sheet can be used in connection with the inventive sheet materials.

The use of a release sheet may be particularly desirable if the release sheet is laminated to an undecorated, adhesive coated sheet material. The undecorated, outer surface of the thusly laminated sheet material can be subsequently printed by silk screen techniques to meet individual distributor's requirements, i.e., the adhesive coating remains intact and does not ooze as a result of the printing procedure. The undecorated laminated sheet material, which is referred to in the industry as "grounds", can be manufactured and marketed as an intermediate, which is sold to other wall manufacturers who will convert it to a fully decorated product of their own styling. Moreover, the release sheet protects against contamination during further processing as noted above.

The invention contemplates the use of a wide variety of base sheets or backings, including but not limited to such materials as woven or non-woven fabrics or paper, plastic film-forming materials, e.g., vinyl polymers, wood veneer, metal foil and the like or a laminate thereof.

For example, to prepare adhesive shelving paper according to the invention, a base sheet which comprises vinyl film is preferably used. To prepare wallpaper according to the invention, a base sheet which comprises a top sheet of vinyl film laminated with adhesive to a polyester, non-woven backing, which provides added strength, is preferably used. The front side of the base sheet may have a decorative pattern embossed, printed, or otherwise imposed thereon. If the sheet material is to be reused, a base sheet having a relatively high tear resistance is preferred, to ensure that the integrity of the sheet material is maintained upon removal from the adhered-to surface.

The dried adhesive coating on the base sheet preferably weighs from about 0.5 to 3 oz. per square yard, and most preferably weighs about 1 oz. per square yard. The thickness of the dried coating preferably ranges from about 0.2 to 3 mil, with from about 0.5 to 1.5 mil being most preferred. Of course, the actual amounts of adhesive utilized will depend on such factors as the weight of the base sheet, the release characteristics of the wax, the nature of the adhered-to surface, and the tackiness of the selected pressure sensitive adhesive.

The sheet materials prepared according to the invention adhere aggressively and securely to a variety of surfaces e.g., painted or unpainted wood, woven and non&woven fabrics, glass, and metal. Generally, the surface does not need to be pretreated in order to allow the sheet material to be readily strippable therefrom without marring or damaging the surface, i.e., the sheet material can be removed from the surface without leaving an adhesive residue or altering the surface in any significant fashion. However, where the sheet material is applied to new dry wall it may be desirable to pre-size or paint the wall to prevent the thin dry wall covering from delaminatin when the sheet material is removed.

After being adhered to the selected surface, the sheet materials of the the invention can be readily stripped or removed therefrom without damaging the adhered-to surface. Moreover, the steps of adhering and stripping can be repeated several times with no discernable degradation of the adherability or releasability exhibited by the sheet. The adherable, yet removable nature of the sheet material does not degrade over time, but instead is maintained.

Since the sheeting can be readily removed, it can be easily repositioned during application to remove bubbles and wrinkles, or to properly match any patterns or designs which appear on the outer side of the base sheet. It has also been found that any bubbles, wrinkles, etc. can be eliminated by simply "smoothing" out the bubbles or wrinkles, without removing the sheet material. Additionally, since the adherable sheet materials of the invention can be readily removed without damaging the adhered-to surface, attractively patterned wallpaper or posters can be prepared for temporary use, to lend a festive atmosphere to a party or other special occasion. Furthermore, because the adherable, yet removable nature of the sheeting does not degrade over time, it can be marketed to renters or other persons who have limited freedom to redecorate their surroundings.

The invention will be further described by reference to the following Examples, which are not intended to be limiting, but rather, illustrative of the invention. These Examples may, of course, be varied in accordance with the spirit of and scope of this description.

EXAMPLE 1

Preparation of Adhesive Coating Composition

Generally, the adhesive coating composition used in the present invention is prepared by combining a premixed wax-in-water emulsion with an aqueous emulsion of a pressure sensitive adhesive and other optional ingredients, such as thickeners and bubble breakers.

By way of example, 7 g of THREE ELEPHANT® borax are combined with 500 g of heated water to form a hot borax solution. Next, 100 g of DR-220 beeswax substitute are melted at a temperature of about 65° C. The melted wax is then added to the hot borax solution, with vigorous agitation, until the dispersion cools to about 40° C.

An adhesive coating composition having a weight ratio of pressure sensitive adhesive to wax of about 15:1, and a solid contents of about 43% can be prepared from the wax emulsion described above by combining the following ingredients:

| Ingredient | Amount (wt %) |
|---|---|
| Wax Emulsion (16% wax) | 15.8 |
| HYCAR ® 2600 × 222 (50% acrylic) | 63.3 |
| HYCAR ® 26171 (50% acrylic) | 12.7 |
| Ammonia (Diluted 50%) | 1.3 |
| ASE ® -75 (Diluted 50%) | 3.8 |
| Bubble Breaker ® 748 | 3.2 |
| | 100.00 |

EXAMPLE 2

Preparation of Adherable, Removable Wallpaper

Adherable, yet removable wallpaper according to the invention can be prepared by first coating the release surface of a conventional release sheet with the adhesive coating composition described in Example 1, using engraved roll coating techniques. The coated released sheet is then heated in an oven at about 175° F. for about 10 to 15 seconds. Next, the adhesive-coated surface of the release sheet is laminated to the inner surface of a conventional wallpaper sheeting.

The wallpaper sheeting is typically constructed of a vinyl film bearing a decorative printing, which is laminated with plastisol adhesive onto a non-woven polyester backing. By way of example, the wallpaper sheeting may be composed of materials having the following weights and thicknesses:

| Material | Weight (oz./yd²) | Thickness (mils) |
|---|---|---|
| Top Vinyl Film | 4.5 | 4.0 |
| Plastisol Adhesive | 0.5 | 0.3 |
| Polyester Backside | 1.0 | 1.5 |
| | 6.0 | 5.8 |

Sufficient amounts of adhesive composition are employed so that the dried adhesive coating is about 1.0 mils thick and weighs about 1 to 1.5 oz per square yard.

What is claimed is:

1. An adherable, yet removable sheet material which comprises a base sheet coated on its inner surface with a modified adhesive comprised of a pressure sensitive adhesive and wax, wherein the wax and pressure sensitive adhesive are used in relative amounts effective to maintain the adherable, yet removable nature of the sheet material over an extended period of time, the weight ratio of pressure sensitive adhesive to wax ranges from about 10:1 to about 30:1, and wherein the modified adhesive has been dried and/or cured as required to render the adhesive adherably viscous.

2. The sheet material according to claim 1, wherein the weight ratio of pressure sensitive adhesive to wax ranges from about 10:1 to about 20:1.

3. The sheet material according to claim 2, wherein the weight ratio of pressure sensitive adhesive to wax is about 15:1.

4. The sheet material according to claim 1, wherein the pressure sensitive adhesive is in the form of an aqueous emulsion.

5. The sheet material according to claim 1, wherein the wax is in the form of a wax-in-water emulsion.

6. The sheet material according to claim 1, which further comprises a release sheet laminated on its release surface to the adhesive-coated surface of the base sheet.

7. The sheet material according to claim 1, wherein the adhesive coating on the base sheet weighs from about 0.5 to 3 oz. per square yard.

8. The sheet material according to claim 7, wherein the adhesive coating weighs about 1 oz. per square yard.

9. The sheet material according to claim 1, wherein the thickness of the adhesive coating on the base sheet ranges from about 0.2 to about 3 mil.

10. The sheet material according to claim 9, wherein the thickness of the adhesive coating ranges from about 0.5 to about 1.5 mil.

11. The sheet material according to claim 1, wherein the sheet material is wallpaper.

12. The sheet material according to claim 1, wherein the sheet material is shelving paper.

13. The sheet material according to claim 1, wherein the sheet material is a poster.

14. The sheet material according to claim 1, wherein the sheet material is a note pad.

15. The sheet material according to claim 1, wherein the sheet material is a label.

* * * * *